(12) United States Patent
Tholen et al.

(10) Patent No.: US 9,085,053 B2
(45) Date of Patent: Jul. 21, 2015

(54) IN-SITU TURBINE BLADE TIP REPAIR

(75) Inventors: Susan M. Tholen, Kennebunk, ME (US); Paul M. Lutjen, Kennebunkport, ME (US)

(73) Assignee: United Technologies Corporation, Hartford, CT (US)

( * ) Notice: Subject to any disclaimer, the term of this patent is extended or adjusted under 35 U.S.C. 154(b) by 1251 days.

(21) Appl. No.: 12/644,396

(22) Filed: Dec. 22, 2009

(65) Prior Publication Data
US 2011/0150636 A1     Jun. 23, 2011

(51) Int. Cl.
F01D 11/08     (2006.01)
B23P 6/00      (2006.01)
F01D 5/00      (2006.01)

(52) U.S. Cl.
CPC ............... B23P 6/007 (2013.01); F01D 5/005 (2013.01); F01D 11/08 (2013.01); *Y10T 29/49318* (2015.01)

(58) Field of Classification Search
CPC ............................ B23P 6/007; F05D 2240/11
USPC ........ 415/108, 118, 126, 173.1, 173.2, 174.1, 415/200
See application file for complete search history.

(56) References Cited

U.S. PATENT DOCUMENTS

| | | | | |
|---|---|---|---|---|
| 3,362,160 | A * | 1/1968 | Bourgeois | 60/805 |
| 3,936,217 | A * | 2/1976 | Travaglini et al. | 415/118 |
| 5,079,910 | A * | 1/1992 | Hirst et al. | 60/803 |
| 5,152,662 | A * | 10/1992 | Hirst et al. | 415/118 |
| 5,197,191 | A * | 3/1993 | Dunkman et al. | 29/889.1 |
| 6,010,746 | A * | 1/2000 | Descoteaux et al. | 427/142 |
| 6,502,303 | B2 | 1/2003 | Updegrove et al. | |
| 6,532,656 | B1 * | 3/2003 | Wilkins et al. | 29/889.1 |
| 6,908,288 | B2 | 6/2005 | Jackson et al. | |
| 7,032,279 | B2 * | 4/2006 | McCarvill et al. | 29/90.01 |
| 7,216,428 | B2 | 5/2007 | Memmen et al. | |
| 7,306,424 | B2 | 12/2007 | Romanov et al. | |
| 7,360,678 | B2 | 4/2008 | Pietruska et al. | |
| 7,476,703 | B2 | 1/2009 | Ruud et al. | |
| 7,509,734 | B2 | 3/2009 | Memmen et al. | |
| 7,509,735 | B2 * | 3/2009 | Philip et al. | 29/889.1 |
| 7,553,128 | B2 | 6/2009 | Abdel-Messeh et al. | |
| 2009/0094829 | A1 * | 4/2009 | Bunting et al. | 29/888.021 |

* cited by examiner

*Primary Examiner* — Nathaniel Wiehe
*Assistant Examiner* — Sean J Younger
(74) *Attorney, Agent, or Firm* — Miller, Matthias & Hull LLP

(57) ABSTRACT

The tip portion of a blade of a gas turbine is repaired in-situ in the gas turbine without removing the blade from the turbine rotor disk. To facilitate the in-situ repair of the tip portion of the turbine blades, one or more access holes may be provided in the turbine shroud or blade outer air seal circumscribing the plurality of turbine blades extending radially outward from the turbine rotor dick.

18 Claims, 3 Drawing Sheets

IN-SITU TURBINE BLADE TIP REPAIR

FIELD OF THE INVENTION

This invention relates generally to gas turbine engines and, more particularly, to the repair of blades for gas turbine engines.

BACKGROUND OF THE INVENTION

Gas turbine engines, such as those used to power modern commercial aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor.

In operation of a gas turbine engine, fuel is combusted in the combustor in compressed air from the compressor thereby generating and high-temperature combustion exhaust gases, which pass through the turbine. In the turbine, energy is extracted from the combustion exhaust gases to turn the turbine to drive the compressor and also to produce thrust. The turbine includes a plurality of turbine stages, wherein each stage includes of a stator section formed by a row of stationary vanes followed by a rotor section formed by a row of rotating blades. In each turbine stage, the upstream row of stationary vanes directs the combustion exhaust gases against the downstream row of blades. Thus, the blades of the turbine are exposed to the high temperature exhaust gases.

Each turbine blade typically has an airfoil-shaped hollow body having a concave surface and a convex surface extending between a leading edge of the blade body to a trailing edge of the blade body. The blade body extends generally radially outwardly from a blade root, whereat the blade root is attached to the turbine rotor disk by a dovetail joint, to a blade tip at the distal end of the blade body. In operation, in order to reduce the passage of combustion exhaust gases outside the blade tips as the blades rotate, thereby reducing turbine efficiency, a tight clearance is established by having the blade tips pass in extremely close proximity to the turbine casing or to actually contact the rub surface of a blade outer air seal. In either case, over time the blade tips of the rotating turbine blades are subject to wear from contact with either the engine casing or the rub surface of the blade outer air seal.

As a result of the associated physical wear and also oxidation due to expose to the high-temperature of the combustion exhaust gases, the blade tips erode over time in service, the turbine blades actually become shorter. As a consequence, the tip clearance at cruise becomes larger and turbine efficiency is degraded. Therefore, it is customary to take gas turbine engines out of operation for overhaul as necessary to service various parts of the engine. As part of the servicing of the engine, it is conventional practice to inspect the turbine blade tips and remove blades having excessively eroded blade tips. Because turbine blades are usually made of expensive superalloys in order to withstand the high temperatures to which the blades are exposed, and because turbine are often cooled through internal cooling air passages, the presence of which make the blades very expansive to manufacture, it is customary to restore the blades, rather then simply scrapping the removed blades. The removed blades are restored by rebuilding the eroded blade tip sufficiently to return the blade body to its original design length using various techniques for depositing repair alloys unto the eroded tip of the removed blade, thereby salvaging the blade. However, conventional restoration methods require the damaged blades to be removed from the engine, restored, and then replaced in the engine, which necessarily requires the engine to remain out of service for an extended period.

SUMMARY OF THE INVENTION

In an aspect of the invention, a method is provided for repairing a tip portion of a blade of a gas turbine having a turbine rotor disk having a plurality of turbine blades and a turbine shroud circumscribing the turbine rotor disk, including the step of rebuilding the tip portion of the rotor blade in-situ without removing the blade from the turbine rotor disk. The method may include the further step of inspecting the tip portion of the blade through an access opening provided in the turbine shroud. The method may include the further step of preparing the tip portion of the blade after inspection and prior to rebuilding the tip portion.

In an embodiment of the method, the step of preparing the tip portion of the blade after inspection and prior to rebuilding the tip portion may include the steps of: inserting a water jet probe through an access opening provided in the turbine casing; and directing a jet of pressurized water against a surface of the tip portion to clean said surface prior to rebuilding the tip portion on said surface. In an embodiment of the method, the step of rebuilding the tip portion of the rotor blade in-situ without removing the blade from the turbine rotor disk may include the steps of: inserting a plasma spray gun through an access opening in the turbine casing; and depositing a material on a surface of the tip portion in an amount sufficient to return the blade to a desired shape and length. The material being deposited on the surface of the tip portion may be a thermal barrier coating, a cubic boron nitride material, and/or a metallic superalloy, including a metallic superalloy including nickel, cobalt, chromium, aluminum and yttrium.

In an aspect of the invention, a method is provided for servicing a gas turbine engine having a turbine including a rotatable turbine rotor disk having a plurality of turbine blades, a turbine shroud including a blade outer air seal circumscribing the plurality of turbine blades. The method includes the steps of: providing an access hole through the blade outer air seal; accessing a tip portion of a turbine blade to be repaired by way of the access hole through the blade outer air seal; and repairing the tip portion of the blade to be repaired in-situ without removing the blade from the gas turbine engine. The method may include the step of selectively rotating the turbine rotor disk to pass the tip portion of each blade of the plurality of blades in juxtaposition with the access hole through the blade outer air seal. In an embodiment, the blade outer seal includes a plurality of access holes spaced both axially and circumferentially over a plurality of seal plates segments to facilitate repair processing in-situ without removal of the damaged blade from the gas turbine engine.

In an embodiment of the method, the step of providing an access hole through the blade outer air seal may include the steps of: providing an access hole through the blade outer air seal having a shape corresponding to an original shape of the tip portion of the blade to be repaired; and providing a seal plug in the access hole through the blade outer air seal, the seal plug having a shape corresponding to an original shape of the tip portion of the blade to be repaired.

In an embodiment of the method, the step of providing an access hole through the blade outer air seal may include the steps of: providing a first access hole through the blade outer air seal; and providing a second access hole through the blade outer air seal, the second access hole spaced circumferentially apart from the first air seal. The method may further include the steps of: locating the first access hole to provide access to a leading portion of the tip portion of the blade to be repaired; and locating the second access hole to provide access to a trailing portion of the tip portion of the blade to be repaired.

In an aspect of the invention, a blade outer air seal is adapted for permitting access to repair turbine blades in a gas turbine engine. The blade outer air seal circumscribes the turbine rotor disk radially outward of and in juxtaposition with the plurality of turbine blades. The blade outer air seal may include a plurality of seal plate segments circumscribing the turbine rotor disk radially outward of and in juxtaposition with the plurality of turbine blades. At least one of the seal plate segments has at least one access hole passing generally radially therethrough. In an embodiment, the blade outer air seal includes a single access hole having an airfoil shape. In an embodiment, the blade outer air seal includes a first access hole and a second access hole extending through the blade outer air seal, the second access hole spaced circumferentially apart from the first access hole. The first access hole is located to provide access to at least a leading portion of the tip of the blade to be repaired and the second access hole is located to provide access to at least a trailing portion of the tip of the blade to be repaired. In an embodiment, the first access hole extends through a first seal plate segment of the blade outer air seal and the second access hole extends through a second seal plate segment of the blade outer air seal.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
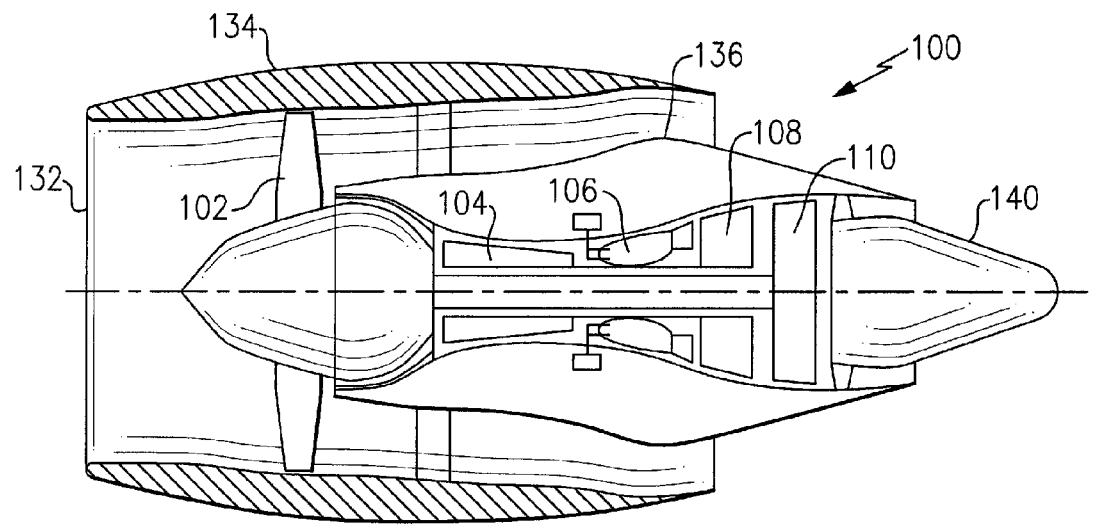
FIG. 1 is a schematic view of a longitudinal section of an exemplary embodiment of a turbofan gas turbine engine.

Referring now in FIG. 1, there is shown an exemplary embodiment of a turbofan gas turbine engine, designated generally as 100, that includes a turbine having rotating blades that could be repaired when the tips thereof are eroded by use of the method for repairing a turbine blade as disclosed herein. The turbofan gas turbine engine 100 includes, from fore-to-aft, a fan 102, a compressor module 104, a combustor module 106, a high pressure turbine module 108, a low pressure turbine module 110 and an exhaust nozzle. A nacelle forms a housing or wrap that surrounds the gas turbine engine 100 to provide an aerodynamic housing about gas turbine engine. In the turbofan gas turbine engine 100 depicted in the drawings, the nacelle includes, from fore to aft, the engine inlet 132, the fan cowl 134, the engine core cowl 136 and the primary exhaust nozzle 140. It is to be understood that the method for repairing a turbine blade as disclosed herein is not limited in application to the depicted embodiment of a gas turbine engine, but is applicable to other types of gas turbine engines, including other types of aircraft gas turbine engines, as well as industrial and power generation gas turbine engines.

Figure 2:
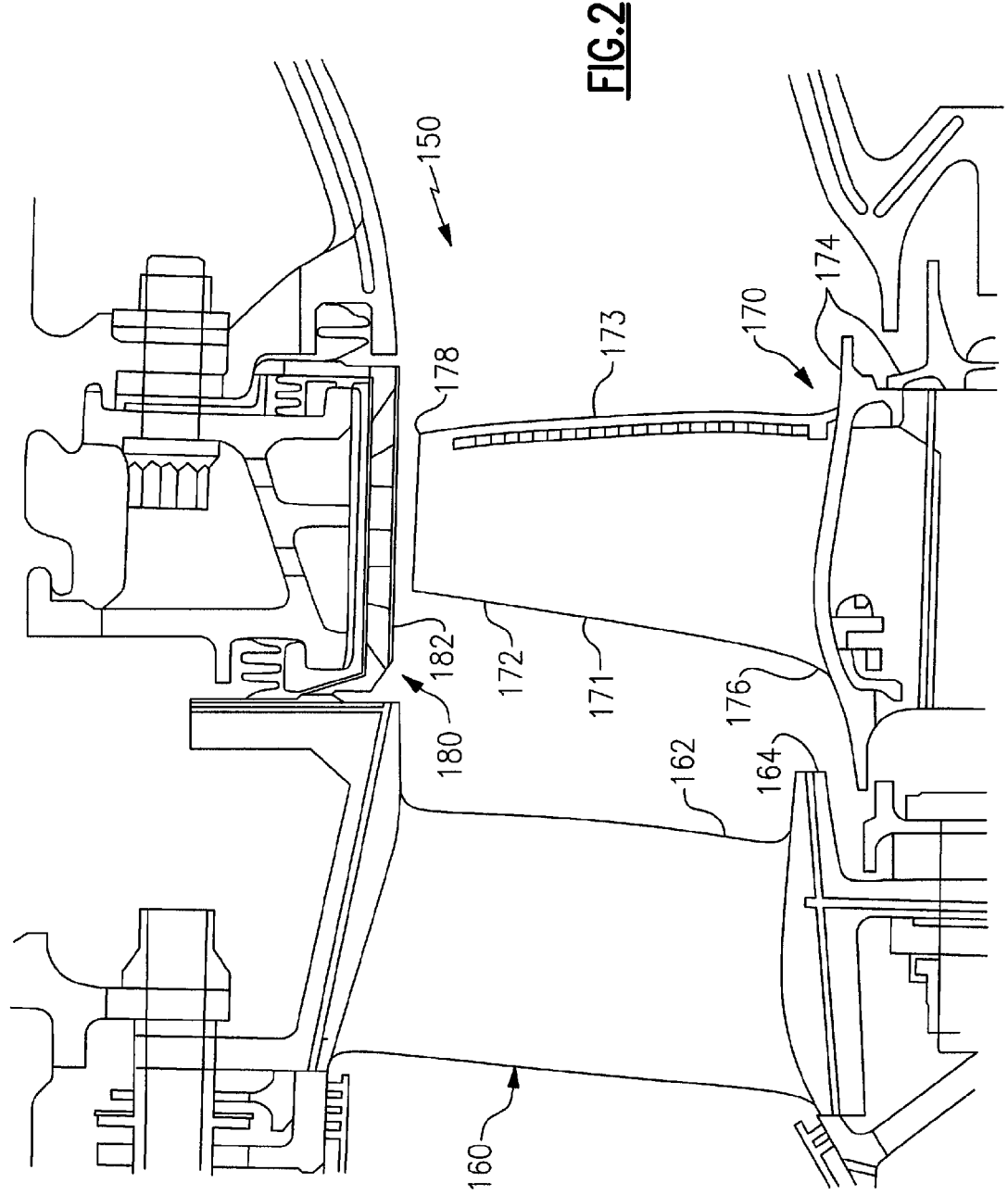
FIG. 2 is side elevation view, partly in section, of an exemplary embodiment of a single turbine stage of a gas turbine engine.

The high pressure turbine module 108 and the low pressure turbine module 110 are disposed within the engine core cowling 136 aft of the combustor module 106 and include a plurality of turbine stages coaxially disposed in an axial array about a central axis. Referring now to FIG. 2, each turbine stage 150 includes a stator section 160 and a rotor section 170, the rotor section 170 disposed downstream of the stator section 160 with respect to flow through the gas turbine engine. The stator section 160 includes a plurality of circumferentially arrayed stationary vanes 162 extending generally radially outwardly from a central disk 164. The vanes 162 direct the flow of hot gases from the combustor into the associated rotor section 170. The rotor section 170 includes a plurality of turbine blades 172 mounted to and arranged in a circumferential array at equally spaced intervals about the circumference of a rotatable rotor disk 174.

Figure 3:
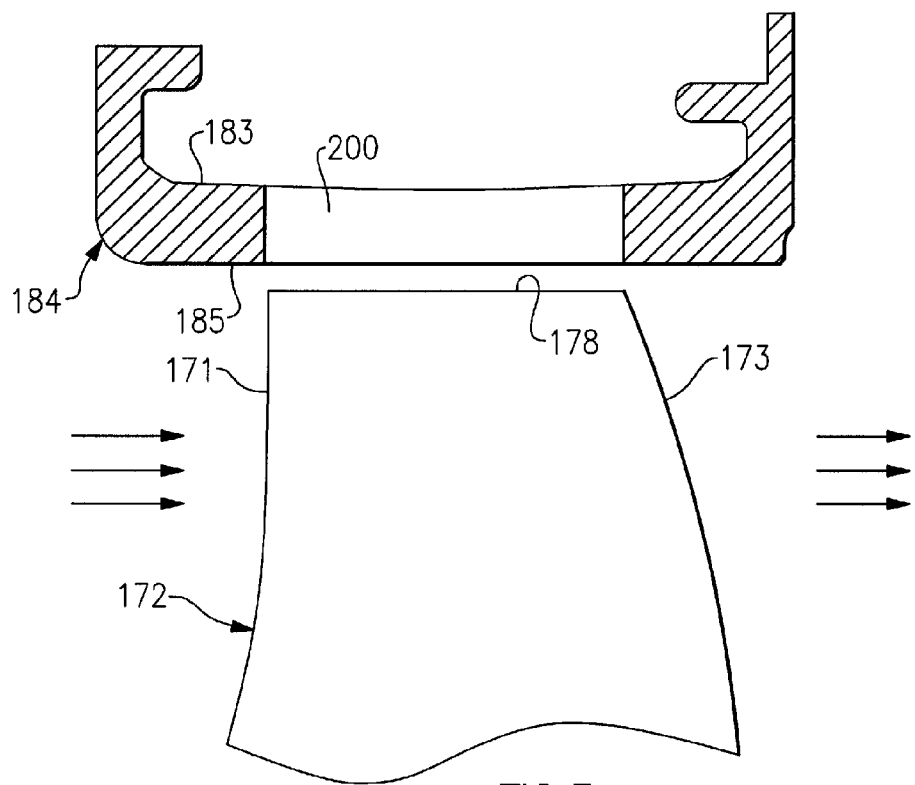
FIG. 3 is an enlarged view of the area of interface between the blade outer air seal and the tip of the turbine blade of FIG. 2.
Figure 4:
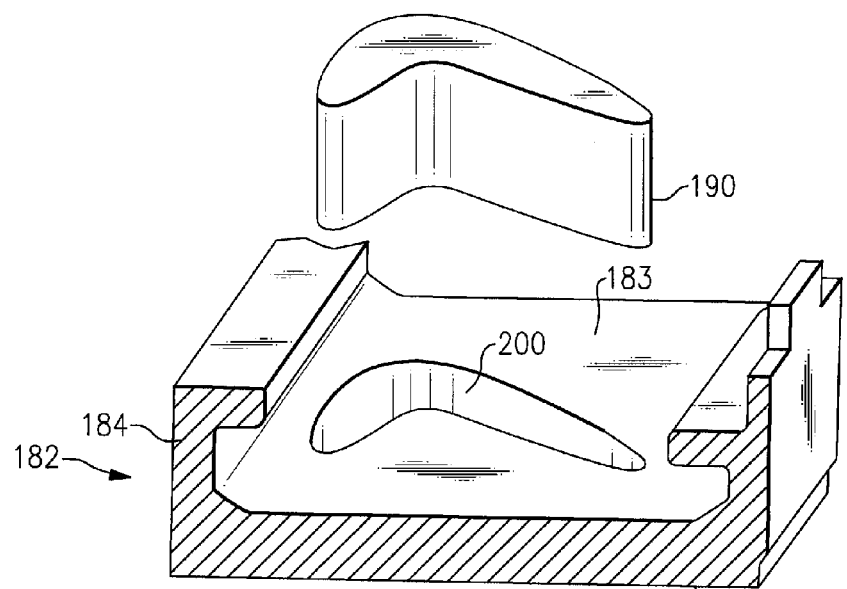
FIG. 4 is a perspective view of an exemplary embodiment of a blade outer air seal segment having a single access hole opening through the blade outer air seal.

Each turbine blade 172 extends generally circumferentially outwardly from an inboard root 176 mounted to the rotor disk 174 to a radially outboard tip 178. Each turbine blade 172 has a leading edge 171 facing upstream into the flow of combustion gases through the turbine and a trailing edge 173 at the downstream side of the turbine blade 172. Referring now to FIGS. 2-4, in particular, each turbine blade 172 may have an airfoil shape with a both a concave surface 175 and a convex surface 177, each having a lateral expanse extending between the leading edge 171 to the trailing edge 173 and a radial expanse extending from the root 176 of the blade to the tip 178 of the blade.

The rotor disk 174 is circumscribed by a turbine shroud 180 disposed radially outboard of and in close proximity to the tip 178 of the turbine blades 172. The turbine shroud 180 may, as in the embodiment depicted in the drawings, include a blade outer air seal 182 formed of a plurality of blade outer air seal segments 184 laid end-to-end in a circumferential row. Each blade outer air seal segment 184 has both axial and circumferential expanse and a face surface 185 juxtaposed in facing relationship with the tips 178 of the turbine blades 172. The blade outer sir seal 182 and segments 184 may be, by way example but not limitation, of the design and construction described in detail in U.S. Pat. No. 7,553,128, assigned to United Technologies Corporation, the same entity to which this application is subject to assignment, the entire disclosure of which is incorporated herein by reference. In operation, as the high velocity, hot combustion gases flow through the turbine section passing over the concave surfaces 175 and convex surfaces 177 of airfoil shaped turbine blades 172, energy is extracted from the combustion gases to drive the rotor of each stage of the turbine in rotation about the central axis of the gas turbine engine. As the turbine blades 172 rotate, the tips 178 of the blades 172 pass in sealing relationship along the face surfaces 185 of the segments 184 of the blade outer air seal 182.

As noted previously, the tips 178 of the turbine blades 172 may erode away over time in service due to oxidation from exposure to the hot combustion gases and/or rub events wherein the tips 178 of the turbine blades 172 actually contact the face surface of the blade outer sir seal 182, or the facing surface of the turbine case if the turbine is not equipped with a blade outer air seal, most commonly occurring during transient conditions of engine operation. The erosion of the tip 178 of the blades 172 results in a gradual shortening of the overall length of the turbine blades 172, thereby increasing the clearance gap between the tips 178 of the blades 172 and the face surface of the blade outer sir seal during operation of the gas turbine engine at cruise. As the clearance gap increases, the portion of the combustion products passing through the clearance gap, rather than passing over the surfaces 175, 177 of the turbine blades 172, also increases, resulting in a decrease in overall efficiency of operation of the gas turbine engine.

In conventional practice, when the length of a turbine blade has become significantly shortened due to blade tip erosion, the blade is customarily removed from the engine and replaced with a new or restored blade. Because turbine blades are expensive to manufacture and are made of expensive materials, it is customary to restore the removed blade to its original design length by rebuilding the eroded blade tip at a repair facility. However, the method for repairing an eroded tip of a turbine blade disclosed herein comprises rebuilding the eroded tip of the turbine blade in-situ without removing the turbine blade from the gas turbine engine. Rather, the eroded tip of a turbine blade is repaired by accessing the blade tip through an opening, or openings, provided in the turbine shroud or blade outer air seal without removing the turbine blade to be repaired from the turbine rotor disk.

Referring now to FIGS. 3 and 4 in particular, in the embodiment of the blade outer air seal depicted therein, the blade outer air seal includes a single access hole 200 for providing access to the tip 178 of a turbine blade 172 when parked therebeneath. The single access hole 200 passes generally radially through the blade outer air seal segment 184 from the back surface 183 to the facing surface 185 and is sized large enough to permit access to the entire tip 178 of the blade 172 for repairing the tip 178. The single access hole 200 may, as illustrated in the particular exemplary embodiment depicted in FIG. 4, be shaped in the form of an airfoil commensurate with the shape of the tips 178 of the turbine blades 172 in an originally pre-erosion form.

Figure 5:
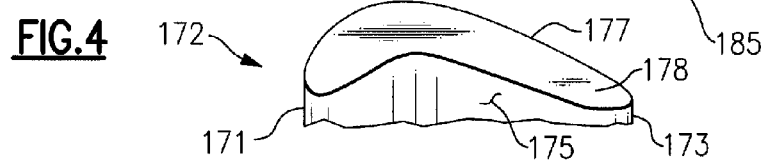
FIG. 5 is a perspective view of an exemplary embodiment of a blade outer air seal segment having a pair of access holes opening through the blade outer air seal.
Figure 5:
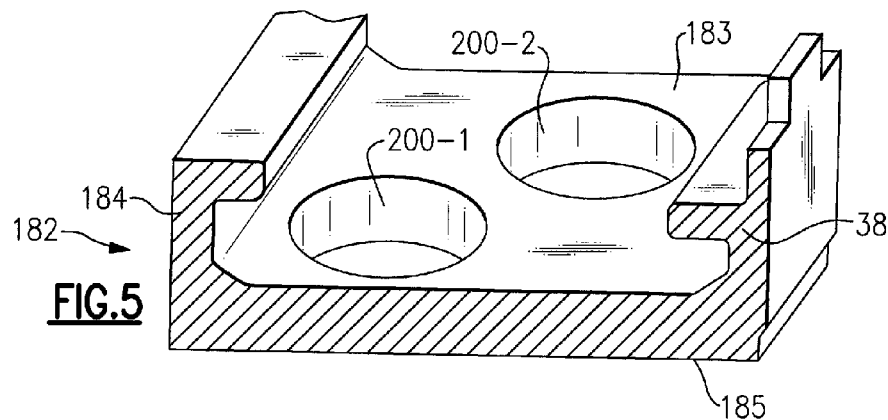

In the embodiment depicted in FIG. 5, the blade outer air seal 182 includes a first access hole 200-1 and a second access hole 200-2. Both of the access holes 200-1, 200-2 extend through the blade outer air seal 182 from the back side 183 of the blade outer air seal to the facing surface 185 of the blade outer air seal. The second access hole 200-2 is spaced circumferentially away from the first access hole 200-1. The first access hole 200-1 located is in the blade outer air seal 182 so as to provide access to at least a leading portion of the tip 178 of the blade 172 to be repaired and the second access hole 200-2 is located to provide access to at least a trailing portion of the tip 178 of the blade 172 to be repaired. Together, the first and second access holes 200-1, 200-2 provide access to the entire tip 178 of each of the turbine blades 172 that need repair.

In the embodiment depicted in FIG. 5, the first access hole 200-1 and the second access hole 200-2 extend through a single blade outer air seal segment 184 of the blade outer air seal 182. However, it is to be understood that the first and second access holes may, if desired, be located in separate blade outer air seal segments that are circumferentially adjacent or even spaced circumferentially apart by at least one intervening blade outer air seal segment not having an access hole therein. Additionally, the method for in-situ blade tip repair disclosed herein may be applied through the use of more than one blade outer air seal segment having a single access hole 200, or through the use of two or more pairs of axially spaced first and second access holes 200-1, 200-2 located over a span of circumferentially spaced blade outer air seals segments, such as for example depicted in FIG. 6. In any multiple access hole scenario, the turbine rotor disk 174 may be selectively rotated to pass the tip portion 178 of each blade of the plurality of blades 172 in juxtaposition with an access hole or sequence of access holes, as appropriate.

The method disclosed herein for repairing a tip portion of a blade of a gas turbine having a turbine rotor disk having a plurality of turbine blades and a turbine shroud circumscribing the turbine rotor disk, includes the step of rebuilding the tip portion of the rotor blade in-situ without removing the blade from the turbine rotor disk. The method may also include the further step of inspecting the tip portion of the blade through an access opening provided in the turbine shroud. The method may also include the further step of preparing the tip portion of the blade after inspection and prior to rebuilding the tip portion.

The step of rebuilding the tip portion 178 of the blade 172 in-situ without removing the blade from the turbine rotor disk 174 may include the steps of: inserting a repair tool through an access opening 200, 200-1, 200-2 in the turbine shroud; and reconstructing the tip portion 178 to return the blade 172 to a desired shape and length. In an embodiment, the step of rebuilding the tip portion 178 of the blade 172 in-situ without removing the blade from the turbine rotor disk 174 may include the steps of: inserting a plasma spray gun through an access opening 200, 200-1, 200-2 in the turbine shroud; and depositing a material on a surface of the tip portion 178 in an amount sufficient to return the blade 172 to a desired shape and length. The material being deposited on the surface of the tip portion 178 may be a thermal barrier coating, a cubic boron nitride material, a metallic superalloy, including a metallic superalloy including nickel, cobalt, chromium, aluminum and yttrium, or any other material having suitable adherence and thermal properties. It is to be understood that the tip portion 178 may be reconstructed in-situ in accord with the method described herein using other suitable reconstruction techniques and is not limited to depositing coating material by a plasma spray using a plasma spray gun.

The step of preparing the tip portion 178 of the blade 172 after inspection and prior to rebuilding the tip portion 178 may include the steps of: inserting a water jet probe through an access opening 200, 200-1, 200-2 provided in the turbine shroud; and directing a jet of pressurized water against a surface of the tip portion 178 to clean that surface prior to rebuilding the tip portion 178 on the cleaned surface. For example, in order to improve the quality of the repair, the tip portion 178 of the blade 172 to be repaired may need to be cleaned to remove oxide coatings developed over time due to exposure to the high temperature gases passing through the turbine. It is to be understood that the tip portion 178 may be prepared in-situ in accord with the method described herein using other suitable cleaning techniques, including for example, but not limited to girt blasting, machining, abrasive cleaning and/or chemical stripping, and is not limited to waterjet blasting.

A method is also disclosed herein for servicing a gas turbine engine having a turbine including a rotatable turbine rotor disk 174 having a plurality of turbine blades 172, a turbine shroud including a blade outer air seal 182 circumscribing the plurality of turbine blades 172. The method includes the steps of: providing an access hole 200 through the blade outer air seal 182; accessing a tip portion 178 of a turbine blade 172 to be repaired by way of the access hole 200 through the blade outer air seal 182; and repairing the tip portion 178 of the blade 172 to be repaired in-situ without removing the blade 172 from the gas turbine engine.

In an embodiment of the method, the step of providing an access hole 200 through the blade outer air seal 182 may include the steps of: providing an access hole 200 through the blade outer air seal 182 having a shape corresponding to an original shape of the tip portion 178 of the blade 172 to be repaired; and providing a seal plug 190 in the access hole 200 through the blade outer air seal 182. When the access hole has an airfoil shape, the seal plug 190 also has an airfoil shape corresponding to an original shape of the tip portion 178 of the blade 172 to be repaired. If the seal plug has an airfoil shape corresponding to an original shape of the tip portion 178 of the blade 172 to be repaired, the seal plug 190 may be used as a template during the rebuilding of the tip portion 178 using plasma spray deposition. It is to be understood that in carrying out the methods disclosed herein, the access hole 200 is not limited to an airfoil shape, but may have a circular shape, an oval shape or any other shape suitable for facilitating access to the tip 178 of the blade 172 to be repaired when that blade is in juxtaposition beneath the access hole 200. The seal plug 190 will have a shape corresponding to the shape of the access hole 200. The seal plug 190 remains disposed within the access hole 200 when the gas turbine engine is in operation to prevent hot gasses from exiting the turbine through the access hole 200 and is removed only when the gas turbine engine is out of service for inspection and repair.

Figure 6:
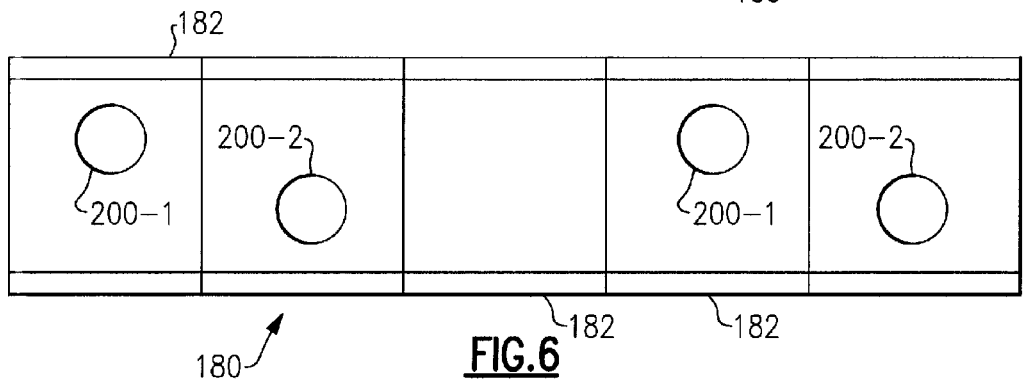
FIG. 6 is a plan view of an exemplary embodiment of a blade outer air seal having a plurality of access holes located over a span of blade outer air seal segments.

In an embodiment of the method, the step of providing an access hole through the blade outer air seal may include the steps of: providing a first access hole 200-1 through the blade outer air seal 182; and providing a second access hole 200-2 through the blade outer air seal 182 for example as depicted in FIG. 6. The second access hole spaced 200-2 is spaced circumferentially apart from the first access hole 200-2. In this embodiment, the method may further include the steps of: locating the first access hole 200-1 to facilitate access to a leading portion of the tip portion 178 of the blade 172 to be repaired; and locating the second access hole 200-2 to facilitate access to a trailing portion of the tip portion 178 of the blade 172 to be repaired.

The method for repairing a tip portion of a turbine blade of a gas turbine as disclosed herein provides for repairing the blade in-situ without removing the blade from the turbine rotor disk. Therefore, the blade tip can be repaired without removing the rotor disk from the turbine, which in an aircraft engine application permits repair of the blade without removing the engine from the aircraft wing. Thus, taking the engine out of service can be avoided by repairing the blade tips in-situ in accord with the method disclosed herein during an overnight or weekend aircraft layover.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications, some of which have been mentioned hereinbefore, may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. A method for repairing a tip portion of a turbine blade of a gas turbine having a turbine rotor disk having a plurality of turbine blades and a turbine shroud circumscribing the turbine rotor disk, the method comprising the step of:
   providing at least one access opening in the turbine shroud, the at least one access opening having an airfoil shape;
   rebuilding the tip portion of the rotor blade in-situ without removing the blade form the turbine rotor disk; and
   providing a removable seal plug, having the airfoil shape, in the at least one access opening in the turbine shroud.

2. The method as recited in claim 1 further comprising the step of rebuilding the tip portion of the blade in-situ further comprises the step of inspecting the tip portion of the blade through at least one access opening provided in the turbine shroud.

3. The method as recited in claim 1 wherein the step of inspecting the tip portion of the blade in-situ comprises the step of inserting an inspection probe through at least one access opening provided in the turbine shroud.

4. The method as recited in claim 1 further comprising the step of preparing the tip portion of the blade after inspection and prior to rebuilding the tip portion.

5. The method as recited in claim 4 wherein the step of preparing the tip portion of the blade after inspection and prior to rebuilding the tip portion comprises the steps of;
   inserting a water jet probe through an access opening provided in the turbine shroud; and
   directing a jet of pressurized water against a surface of the tip portion to clean said surface prior to rebuilding the tip portion on said surface.

6. The method as recited in claim 1 wherein the step of rebuilding the tip portion of the rotor blade in-situ without removing the blade from the turbine rotor disk comprises the steps of:
   inserting a plasma spray gun through an access opening in the turbine shroud; and
   depositing a material on a surface of the tip portion in an amount sufficient to return the blade to a desired shape and length.

7. The method as recited in claim 6 wherein the material being deposited on said surface of the tip portion comprises a material selected from the group including a thermal barrier coating, a cubic boron nitride, and a metallic superalloy.

8. The method as recited in claim 6 wherein the material being deposited on said surface of the tip portion comprises a metallic superalloy including nickel, cobalt, chromium, aluminum and yttrium.

9. A gas turbine blade repaired by the method of claim 1.

10. A method for servicing a gas turbine engine having a turbine including a rotatable turbine rotor disk having a plurality of turbine blades, a turbine shroud including a blade outer air seal circumscribing the plurality of turbine blades, the method comprising the step of:
    providing at least one access hole, having an airfoil shape corresponding to an original shape of a tip portion of the blade to be repaired, through the blade outer air seal;
    accessing the tip portion of a turbine blade to be repaired by way of the access hole through the blade outer air seal;
    repairing the tip portion of the blade to be repaired in-situ without removing the blade from the gas turbine engine; and
    providing a removable seal plug, having the airfoil shape corresponding to the original shape of the tip portion of the blade to be repaired, in the at least one access hole through the blade outer air seal.

11. The method as recited in claim 10 further comprising the step of selectively rotating the turbine rotor disk to pass the tip portion of each blade of the plurality of blades in juxtaposition with at least one access hole through the blade outer air seal.

12. The method as recited in claim 10 wherein the step of providing at least one access hole through the blade outer air seal comprises the steps of:
providing a first access hole through the blade outer air seal; and
providing a second access hole through the blade outer air seal, the second access hole space circumferentially apart from the first access hole.

13. The method as recited in claim 12 further comprising the steps of:
locating the first access hole to provide access to a leading portion of the tip portion of the blade to be repaired; and
locating the second access hole to provide access to a trailing portion of the tip portion of the blade to be repaired.

14. The method as recited in claim 11 wherein the step of repairing the tip portion of the blade to be repaired comprises the steps of:
inspecting the tip portion of each blade of the plurality of blades in-situ without removing the blades from the turbine rotor disk to determine whether the tip portion of each blade requires repair; and
rebuilding the tip portion of each blade requiring repair in-situ without removing the blade from the turbine rotor disk.

15. The method as recited in claim 14 wherein the step of rebuilding the tip portion of each blade requiring repair in-situ without removing the blade from the turbine rotor disk includes the steps of:
inserting a water jet probe through the access opening through the blade outer air seal;
directing a jet of pressurized water against a surface of the tip portion of a blade being repaired to clean said surface;
inserting a plasma spray gun through the access opening through the blade outer air seal; and
depositing a material on a surface of the tip portion in an amount sufficient to return the blade being repaired to a desired shape and length.

16. A blade outer air seal for use in a gas turbine engine including a turbine rotor disk having a plurality of turbine blades extending generally radially outward, the blade outer air seal comprising: a plurality of blade outer air seal segments extending circumscribing about the turbine rotor disk radially outward of and in juxtaposition with the plurality of turbine blades, at least one of the blade outer air seal segments having at least one access hole, having an airfoil shape, passing generally radially therethrough; and
at least one seal plug, having the airfoil shape, removably disposed in the at least one access hole of the at least one of the blade outer air seal segments.

17. The blade outer air seal as recited in claim 16 wherein the at least one access hole comprises:
at least one first access hole extending through the blade outer air seal and located to provide access to a leading portion of the tip portion of the blade to be repaired; and
at least one second access hole extending through the blade outer air seal, the at least one second access hole spaced circumferentially apart from the at least one first access hole and located to provide access to a trailing portion of the tip portion of the blade to be repaired.

18. The blade outer air seal as recited in claim 16 wherein the at least one access hole comprises:
a first access hole extending through a first blade outer air seal segment of the blade outer air seal, the first access hole located to provide access to a leading portion of the tip portion of the blade to be repaired; and
a second access hole extending through a second blade outer air seal segment of the blade outer air seal, the second access hole spaced circumferentially apart from the first access hole and located to provide access to a trailing portion of the tip portion of the blade to be repaired.

* * * * *